June 12, 1951          L. B. OBENCHAIN          2,556,210
AWNING FOR TRAILERS
Filed March 5, 1948                    2 Sheets-Sheet 1
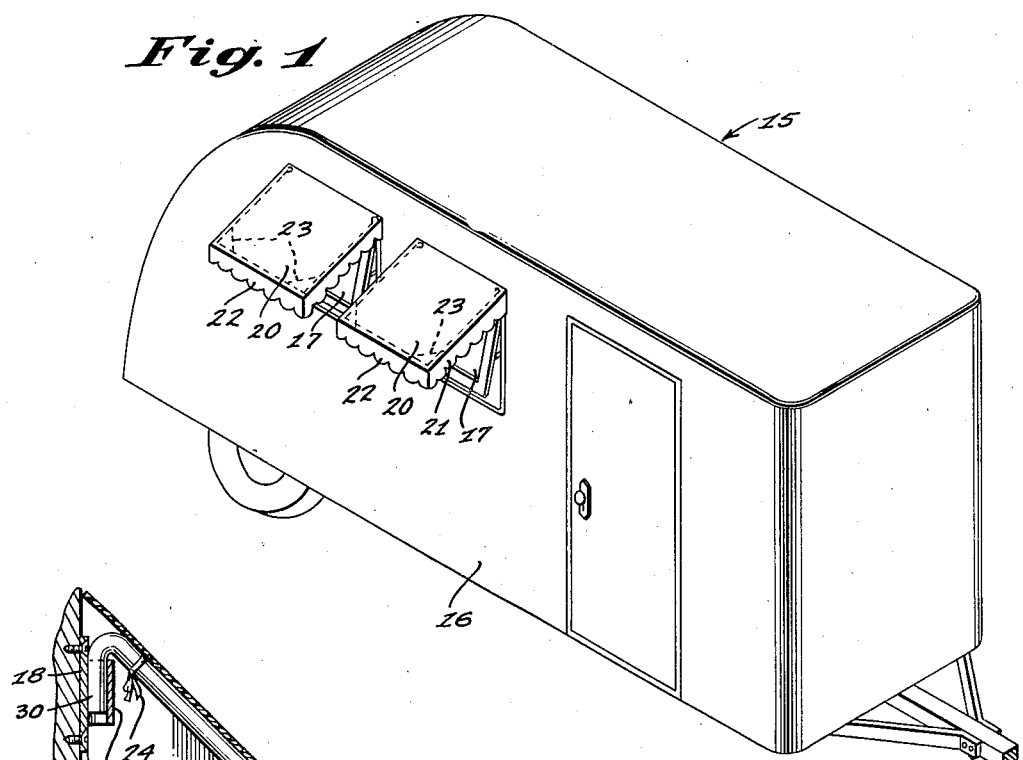
Fig. 1
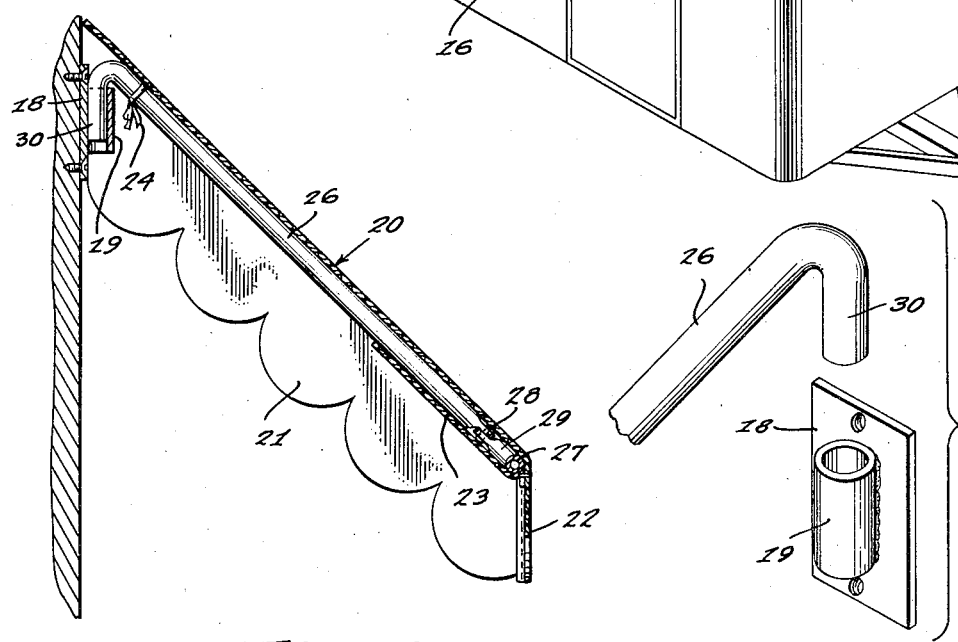
Fig. 2            Fig. 3
Fig. 4
INVENTOR.
LEO B. OBENCHAIN
ATTORNEYS June 12, 1951   L. B. OBENCHAIN   2,556,210
AWNING FOR TRAILERS Filed March 5, 1948   2 Sheets-Sheet 2

INVENTOR.
LEO B. OBENCHAIN
BY
ATTORNEYS

Patented June 12, 1951

2,556,210

UNITED STATES PATENT OFFICE 2,556,210

AWNING FOR TRAILERS

Leo B. Obenchain, Revere, Mass.

Application March 5, 1948, Serial No. 13,281

3 Claims. (Cl. 160—19)

This invention relates to awnings for trailers.

An object of the invention is the provision of a simple and efficient awning that may be applied to and removed readily from an exterior wall of a trailer and folded into a neat and compact bundle for storage, said awning being sufficiently rigid and durable to withstand storms while protecting windows from the sun's rays and rain.

Another object of the invention is the provision of an awning having a foldable metal framework formed of tubes.

A further object of the invention is the provision of an awning for a trailer in which a foldable framework is employed for supporting the usual fabricated materials for protecting a pair of windows against rain and sunshine, said framework being in the form of a U-shaped member having a bight portion composed of two rods hingedly connected at the inner ends thereof, the legs of the U-shaped member being also hinged adjacent the outer ends of the bight portion, the legs being foldable onto the adjacent rods forming the bight portion.

The invention consists in the novel construction, arrangement and combinations of parts hereinafter more particularly described and claimed.

In the drawings:

Figure 1 is a view, in perspective, showing my simplified form of awning applied to a window of a trailer.

Figure 2 is a transverse vertical section of the awning taken along a leg of a U-shaped frame.

Figure 3 is a fragmentary view in perspective showing the attaching means for the free ends of the legs of the U-shaped frame.

Figure 4 is a side view of the supporting frame folded into a compact bundle.

Figure 5:
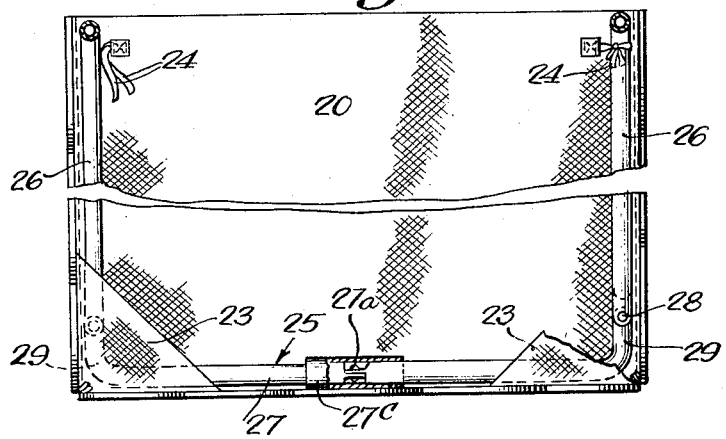
Figure 5 is a bottom plan view of the awning with parts of the fabric broken away to disclose the frame.

Referring more particularly to Figures 1 to 5, inclusive, of the drawings, 15 designates a trailer having a side wall 16 provided with a pair of windows 17. Brackets 18 having vertical bearings 19 are secured in pairs on the wall 16 with one bracket being located at each side of the window casing adjacent the top thereof.

A U-shaped framework which is composed preferably of metal tubes or pipes supports a fabric covering 20 having flaps 21 at the side edges and a flap 22 at the front edge. Triangularly-shaped pockets 23 are formed in the corners of the fabric at the front edge and located on the under face of the fabric. Tapes 24 secure the inner or upper edge of the fabric to the framework (Figure 2) and in close association with the wall 16.

The framework consists principally of a U-shaped member 25 having hinged legs 26 which may be moved inwardly towards the bight portion 27 for folding purposes. The legs are pivoted at 28 on short inturned ends 29 of the bight portion. The outer free ends of the legs are bent downwardly at 30 for reception by the sockets 19 which are attached to the wall 16 by the brackets 18.

The bight portion 27 is formed of two sections hingedly-connected together at 27a so that when larger lengths of awnings are employed the frame of said awning may be folded into a small bundle. A sleeve 27c is forced over the pivot 27a for retaining the bight portion 27 rigid.

The awning shown in Figures 1 to 4, inclusive, may be applied readily to the windows 17 by inserting the bent ends 30 of the legs 26 into the socket 19 fastened to the wall 16 of the trailer. The bent ends and the sockets are sufficient to retain the awning in place. The awning when released from the sockets 19 may be folded into a compact unit (Figure 4) by removing the fabric 20 after the tapes 24 have been released and then folding the legs 26 onto the bight portion 27.

What I claim:

1. An awning including a foldable supporting frame work comprising a U-shaped member, the legs of said member being pivoted on the ends of the bight portion, vertical tubular bearings secured to a fixed support, the free ends of the legs being downturned and received by the bearings and a readily removable fabric covering on the framework, the lower corners of said covering having corner pockets for receiving said ends of the bight portion and the upper corners of said covering having securing tapes the legs being foldable on the bight portion when the awning has been removed from the fixed support.

2. An awning for a trailer comprising a foldable framework including a U-shaped member, the legs of said member being pivoted on the ends of the bight portion of the member, the bight portion being pivoted intermediate the ends thereof, a sleeve member on the bight portion slidable over the intermediate pivoted ends thereof thereby to render the bight portion rigid, a pair of brackets each having means of attachment to a vertical wall of the trailer and each having a vertically disposed tubular bearing, the free ends of the legs each being downturned at an acute angle and received within said bearings whereby the framework depends diagonally downward from said trailer wall, a removable fabric covering on the framework, the lower corners of said covering having corner pockets for receiving said ends of the bight portion and the upper corners of said covering having securing tapes, the legs being foldable on the bight portion and the bight portion being foldable on itself when the awning has been removed from the trailer and the sleeve member moved away from said intermediate ends of the bight portion.

3. In an awning for a trailer having a fabric covering, the improvement comprising a foldable tubular framework including a U-shaped member, the legs of said member being pivoted on the ends of the bight portion of the member, said bight portion comprising two substantially equal sections pivoted together at the inner ends thereof, a tubular member sleeved on the bight portion and movable over the pivotally joined ends thereof thereby to render the bight portion rigid, a pair of brackets each having means of attachment to a vertical wall of the trailer and each having a vertically disposed tubular bearing, the free ends of the legs each being downturned at an acute angle and received within said bearings whereby the framework depends diagonally downward from said trailer wall, the legs being foldable on the bight portion and the sections of the bight portion being foldable together when the awning has been removed from the trailer and said sleeved member has been moved away from said inner ends of the bight portion.

LEO B. OBENCHAIN.

REFERENCES CITED

The following references are of record in the file of this patent:

UNITED STATES PATENTS

| Number | Name | Date |
|---|---|---|
| 653,484 | McCullough | July 10, 1900 |
| 1,269,314 | Sabel | June 11, 1918 |
| 1,813,525 | Astrup | July 7, 1931 |
| 2,201,887 | De Bord | May 21, 1940 |